United States Patent
Lim et al.

(10) Patent No.: US 10,488,821 B2
(45) Date of Patent: Nov. 26, 2019

(54) HOLOGRAPHIC DISPLAY APPARATUS AND METHOD USING FOCUS PLANE SCANNING SCHEME

(71) Applicant: ELECTRONICS AND TELECOMMUNICATIONS RESEARCH INSTITUTE, Daejeon (KR)

(72) Inventors: Yongjun Lim, Sejong (KR); Keehoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/923,813

(22) Filed: Mar. 16, 2018

(65) Prior Publication Data
US 2018/0267467 A1 Sep. 20, 2018

(30) Foreign Application Priority Data
Mar. 16, 2017 (KR) .................. 10-2017-0033341

(51) Int. Cl.
*G03H 1/00* (2006.01)
*G03H 1/22* (2006.01)
(Continued)

(52) U.S. Cl.
CPC .......... *G03H 1/2205* (2013.01); *G03H 1/0005* (2013.01); *G03H 1/0248* (2013.01);
(Continued)

(58) Field of Classification Search
CPC .. G03H 1/2205; G03H 1/0005; G03H 1/2294; G03H 1/08; G03H 2222/36;
(Continued)

(56) References Cited

U.S. PATENT DOCUMENTS 5,822,263 A 10/1998 Campbell et al.
6,061,154 A 5/2000 Campbell et al.
(Continued)

FOREIGN PATENT DOCUMENTS

JP 2009-020483 A 1/2009
KR 10-1999-0007451 A 1/1999
(Continued)

*Primary Examiner* — Zhihan Zhou (57) ABSTRACT

A holographic display apparatus is provided. The holographic display apparatus includes a spatial light modulator configured to diffract light emitted from an incident light source with a shape corresponding to a computer generated hologram (CGH) pattern to generate an image signal, a filtering optical system configured to filter the image signal to select a first signal component among signal components included in the image signal, a first formation optical system configured to form a focus plane with a smaller size than the first image plane on a surface of a mirror via focus on the first image plane based on the first signal component, and a focus scanner configured to form a beam in a direction of 360 degrees based on a tilting angle of the mirror and rotation of the mirror.

18 Claims, 8 Drawing Sheets

(51) Int. Cl.
*G03H 1/08* (2006.01)
*G03H 1/02* (2006.01)

(52) U.S. Cl.
CPC ............. *G03H 1/08* (2013.01); *G03H 1/2294* (2013.01); *G03H 2001/0088* (2013.01); *G03H 2001/221* (2013.01); *G03H 2001/2207* (2013.01); *G03H 2001/2239* (2013.01); *G03H 2222/36* (2013.01); *G03H 2223/24* (2013.01)

(58) Field of Classification Search
CPC ..... G03H 2001/2239; G03H 2001/221; G03H 2001/0088; G03H 2223/24; G03H 1/0248; G03H 1/2207
See application file for complete search history.

(56) References Cited

U.S. PATENT DOCUMENTS

| | | | |
|---|---|---|---|
| 6,195,184 B1* | 2/2001 | Chao ................ | G03H 1/08 359/22 |
| 9,632,005 B1* | 4/2017 | Olczak ............. | G01M 11/00 |
| 9,658,378 B2 | 5/2017 | Song et al. | |
| 2008/0309998 A1 | 12/2008 | Nakamura | |
| 2009/0008580 A1* | 1/2009 | Luberek ............ | G02B 27/46 250/559.1 |
| 2011/0109962 A1* | 5/2011 | Cui .................. | A61B 5/0059 359/385 |
| 2012/0307259 A1* | 12/2012 | Leung ............... | G01B 11/0608 356/603 |
| 2014/0140654 A1* | 5/2014 | Brown .............. | G02F 1/29 385/10 |
| 2014/0226193 A1 | 8/2014 | Sun | |
| 2014/0285862 A1* | 9/2014 | Song ................. | G02B 5/32 359/16 |
| 2015/0168914 A1* | 6/2015 | Gelman ............ | G03H 1/2205 359/9 |
| 2015/0198924 A1 | 7/2015 | Woida-O'Brien | |
| 2016/0057409 A1* | 2/2016 | Kim .................. | H04N 9/3164 348/54 |
| 2016/0135680 A1* | 5/2016 | Anderson ......... | A61B 3/0025 351/206 |
| 2016/0202485 A1* | 7/2016 | Yamada ............ | G02B 26/10 345/8 |
| 2016/0223987 A1 | 8/2016 | Park et al. | |
| 2017/0024890 A1 | 1/2017 | Yoon | |
| 2017/0328989 A1* | 11/2017 | Bartlett ............. | G01S 7/4814 |
| 2018/0039049 A1* | 2/2018 | Lee .................. | G02B 13/0045 |

FOREIGN PATENT DOCUMENTS

| | | |
|---|---|---|
| KR | 10-1999-0007452 A | 1/1999 |
| KR | 10-2014-0114651 A | 9/2014 |
| KR | 10-2016-0022436 A | 3/2016 |
| KR | 10-2016-0080817 A | 7/2016 |
| KR | 10-2016-0082364 A | 7/2016 |

\* cited by examiner

HOLOGRAPHIC DISPLAY APPARATUS AND METHOD USING FOCUS PLANE SCANNING SCHEME

CROSS-REFERENCE TO RELATED APPLICATION

This application claims priority to and the benefit of Korean Patent Application No. 10-2017-0033341 filed in the Korean Intellectual Property Office on Mar. 16, 2017, the entire contents of which are incorporated herein by reference.

BACKGROUND OF THE INVENTION (a) Field of the Invention

The present invention relates to a method and apparatus for displaying a hologram image reproduced by a spatial light modulator in all directions of 360 degrees.

(b) Description of the Related Art

Digital holography is a technology for displaying brightness information and phase information of light on a spatial light modulator (SLM) using a laser as a coherent light source to display a three-dimensional (3D) image.

To embody a digital holographic display system, a spatial light modulator device for modulating brightness information or phase information of light is required and, mainly, liquid crystal (LC), liquid crystal on silicon (LCoS), a digital micro-mirror device (DMD), and so on are used as an SLM.

Depending on performance of a spatial light modulator (SLM), resolution, a viewing angle, a size, and so on of an image that a user lastly sees are determined. An image size is determined depending on resolution of a spatial light modulator (SLM) and a viewing angle is determined depending on each element pixel size or a pixel pitch of the spatial light modulator (SLM).

However, due to a performance restriction of a currently available spatial light modulator (SLM), it is not physically possible to form a 3D hologram image that is viewable in all directions of 360 degrees using only a single flat type SLM structure.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a 360-degree holographic display method and apparatus using a focus plane scanning scheme.

An exemplary embodiment of the present invention provides a holographic display system that is capable of performing observation in all directions of 360 degrees via a hologram focus plane scanning scheme and a method for implementing the holographic display system.

According to an exemplary embodiment of the present invention, a holographic display apparatus is provided. The holographic display apparatus includes a spatial light modulator configured to diffract light emitted from an incident light source with a shape corresponding to a computer generated hologram (CGH) pattern to generate an image signal, a filtering optical system configured to filter the image signal to select a first signal component among signal components included in the image signal, a first formation optical system configured to form a focus plane with a smaller size than the first image plane on a surface of a mirror via focus on the first image plane based on the first signal component, and a focus scanner configured to form a beam in a direction of 360 degrees based on a tilting angle of the mirror and rotation of the mirror.

The first formation optical system may focus a signal of the first image plane in the form of the focus plane on the surface of the mirror through a lens.

The mirror may have a diameter equal to or less than 20 mm and a microelectromechanical system (MEMS) method may be applied to the mirror.

The focus scanner may tilt a path of the beam at a first angle indicating a degree by which the mirror is tilted in a first direction with respect to an optical axis of the mirror and a second angle indicating a degree by which the mirror is tilted in a second direction opposite to the first direction with respect to the optical axis of the mirror and rotates and rotate the mirror with respect to a central axis of the mirror.

The holographic display apparatus may further include a second formation optical system configured to apply the beam to an omnidirectional lens to form a hologram image in a direction of 360 degrees.

The holographic display apparatus may further include a second formation optical system configured to apply the beam to a conical lens to form a hologram image in a direction of 360 degrees.

According to another exemplary embodiment of the present invention, a holographic display apparatus is provided. The holographic display apparatus includes a filtering optical system configured to filter an image signal diffracted by a spatial light modulator, a first formation optical system configured to allow a focus plane to be incident on a surface of a mirror at a first angle with respect to a central axis of the mirror via focus on a first image plane based on the filtered image signal, and a focus scanner configured to form a beam in a direction of 360 degrees based on a second angle indicating a degree by which the mirror is tilted with respect to a first axis of the mirror and rotation of the mirror, performed based on a central axis of the mirror.

According to another exemplary embodiment of the present invention, a method of displaying a holographic display apparatus is provided. The method includes diffracting light emitted from an incident light source with a shape corresponding to a computer generated hologram (CGH) pattern to generate an image signal, filtering the image signal, forming a focus plane on a surface of a mirror via focus on a first image plane based on the filtered image signal, and controlling a tilting angle of the mirror and rotation of the mirror to form a beam in a direction of 360 degrees.

The forming of the focus plane may include focusing a signal of the first image plane in the form of the focus plane with a smaller size than the first image plane on the surface of the mirror through a lens.

The forming of the focus plane may include allowing the focus plane to be incident on the surface of the mirror at a first angle with respect to a central axis of the mirror through a lens.

The forming of the beam may include tilting a path of the beam at a first angle indicating a degree by which the mirror is tilted in a first direction with respect to a first axis of the mirror and a second angle indicating a degree by which the mirror is tilted in a second direction opposite to the first direction with respect to the first axis, and rotating the mirror based on a central axis of the mirror.

The method may further include applying the beam to an omnidirectional lens or a conical lens to form a hologram image in a direction of 360 degrees.

An exemplary embodiment of the present invention provides a hologram display apparatus using a microelectromechanical system (MEMS) scanner that is capable of being electronically driven or the like through a structure for applying focus (or focus plane) scan of a hologram image required to form a hologram image of a direction of 360 degrees.

According to an exemplary embodiment of the present invention, a volume of a digital holographic display system may be reduced through a hologram display apparatus.

According to an exemplary embodiment of the present invention, a freedom degree of a method of forming 360-degree volume hologram by scanning an image surface may be enhanced to freely change a system design.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a repeated explanation of the same elements will not be given.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

Terms used in this disclosure are used to describe specified embodiments and are not intended to limit the scope of another embodiment.

In the specification, the terms of a singular form may include plural forms unless otherwise specified.

It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. In the specification, the expression 'A or B' may include any or all combinations of the plurality of disclosed items.

Hereinafter, a holographic display apparatus embodied by scanning a focus plane of a spatial light modulator (SLM) in a direction of 360 degrees will be described. In addition, hereinafter, an apparatus for applying an electronic control method to embody a temporal multiplexing method will be described.

Figure 1:
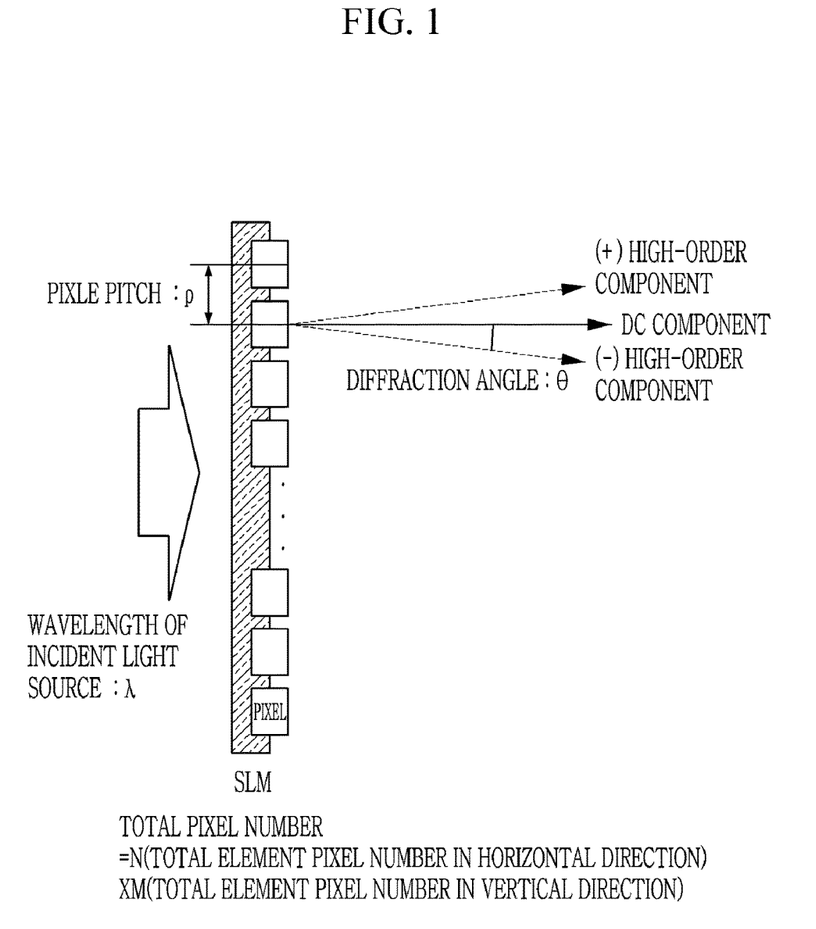
FIG. 1 is a diagram illustrating a viewing angle of a spatial light modulator (SLM).

FIG. 1 is a diagram illustrating a viewing angle of a spatial light modulator (SLM).

As illustrated in FIG. 1, depending on the physical properties of a spatial light modulator (SLM), i.e., a pixel pitch 'p' and a wavelength size 'λ' of a light source that is incident on the spatial light modulator (SLM), a viewing angle of a hologram image may satisfy a relationship according to Equation 1 below (a relationship between an viewing angle θ and p).

$$\theta = \sin^{-1}\left(\frac{\lambda}{2p}\right) \quad \text{[Equation 1]}$$

According to Equation 1 above, due to a wavelength of incident light and a limited pixel pitch of a spatial light modulator (SLM), it may be impossible to form a viewing angle with a value of 360 degrees using only a single SLM. Accordingly, to form an image that is capable of being viewed in all directions of 360 degrees, there is a need for a technology for compensating for the insufficient resolution and pixel pitch of the spatial light modulator (SLM). To this end, a temporal multiplexing scheme or a spatial multiplexing scheme is mainly used.

A mainly used temporal multiplexing scheme is a method of scanning a hologram image surface using a turning motor, etc. which are operable at high speed. A digital micro-mirror device (DMD) of temporally dividing a direction of 360 degrees (temporal multiplexing) to change an image at high speed is mainly used.

However, as a size of an optical system for showing a required image surface is increased in proportion to a size of an image surface, a size of a device for scanning an image surface is also increased. This is the main reason for increase in an overall system. A 360-degree holographic display apparatus for implementing such a temporal multiplexing method will be described with reference to FIG. 2.

Figure 2:
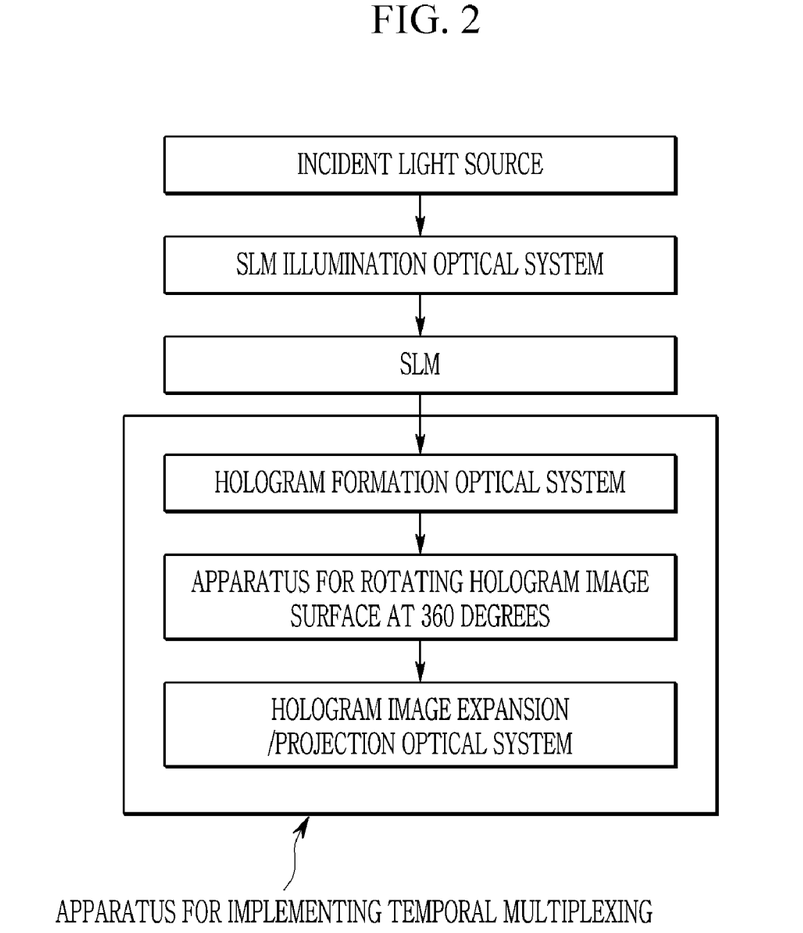
FIG. 2 is a diagram showing a 360-degree holographic display apparatus including a device for implementing temporal multiplexing.

FIG. 2 is a diagram showing a 360-degree holographic display apparatus including a device for implementing temporal multiplexing.

As illustrated in FIG. 2, a mainly used incident light source may be coherent light source such as a laser and may be used to illuminate an SLM. The incident light source is transmitted through an SLM illumination optical system for illuminating an entire area of an SLM with uniform intensity and phase prior to illumination of the SLM.

Then, the SLM may display a computer generated hologram (CGH). The light source for illuminating the SLM may be diffracted by a CGH pattern displayed on the SLM and a hologram image for representing a 3-dimensional (3D) image may be displayed through a hologram formation optical system.

Then, the formed hologram image may be transmitted in all directions of 360 degrees through a hologram image surface 360-degree rotation device of an apparatus for implementing temporal multiplexing and may be lastly provided to a user through a hologram image expansion/projection optical system of an apparatus for implementing temporal multiplexing.

When a digital holographic display system that is capable of performing observation in all horizontal directions of 360 degrees is embodied using the aforementioned technologies, there is a limit in downsizing a system for the following reasons. It may be required to additionally embody a temporal multiplexing method, a spatial multiplexing method, or the like, for forming a volume hologram image in all directions of 360 degrees. A size of an optical system and a size of a rotation device for driving the optical system are increased in proportion to a size of a volume image to be reproduced.

Hereinafter, a method of embodying a holographic display system that is capable of performing observation in all directions of 360 degrees using a hologram focus plane scanning scheme and a method of downsizing the holographic display system will be described.

Figure 3:
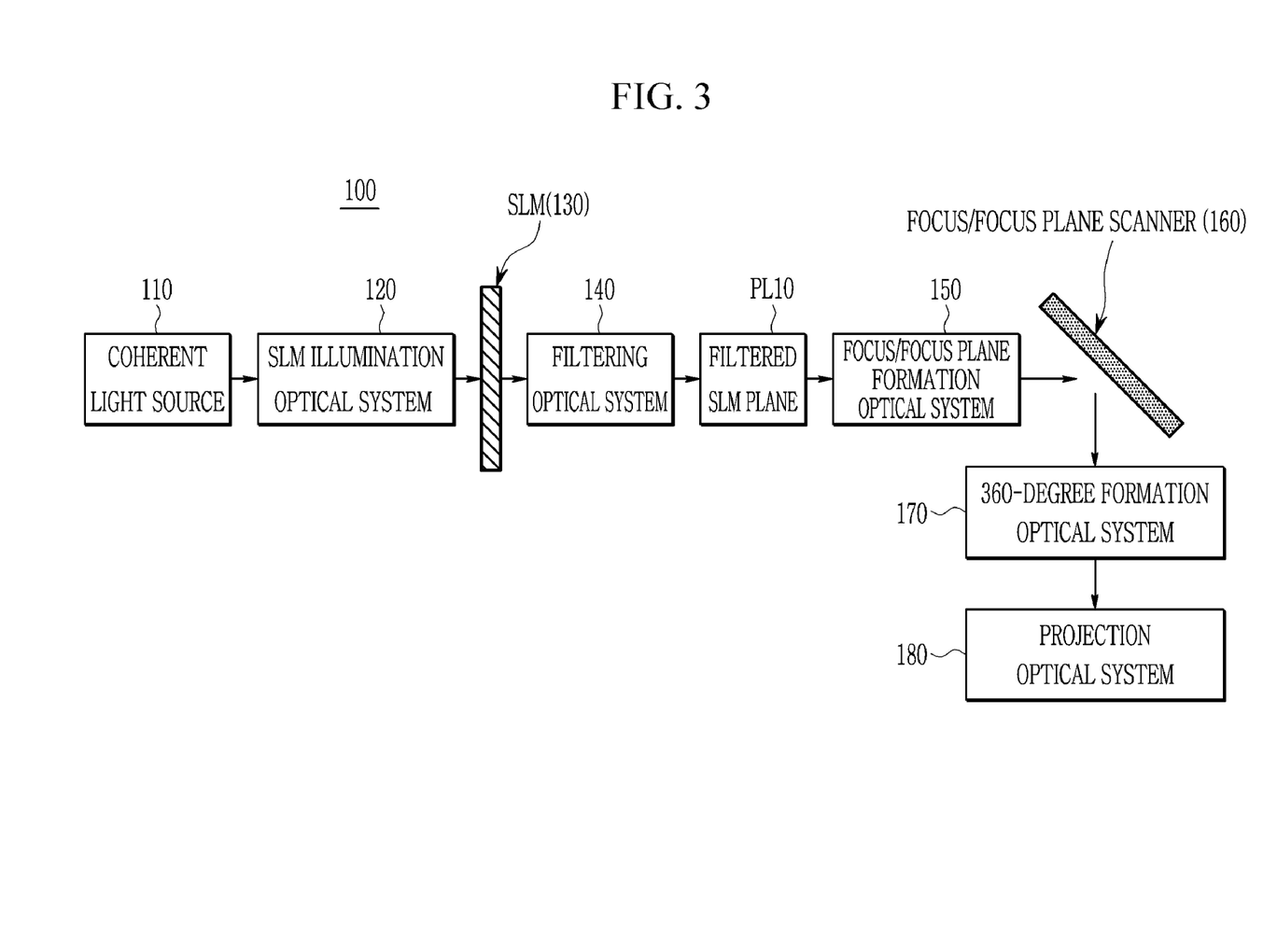
FIG. 3 is a diagram showing a 360-degree holographic display apparatus using a hologram focus plane scanning scheme according to an exemplary embodiment of the present invention.
Figure 4:
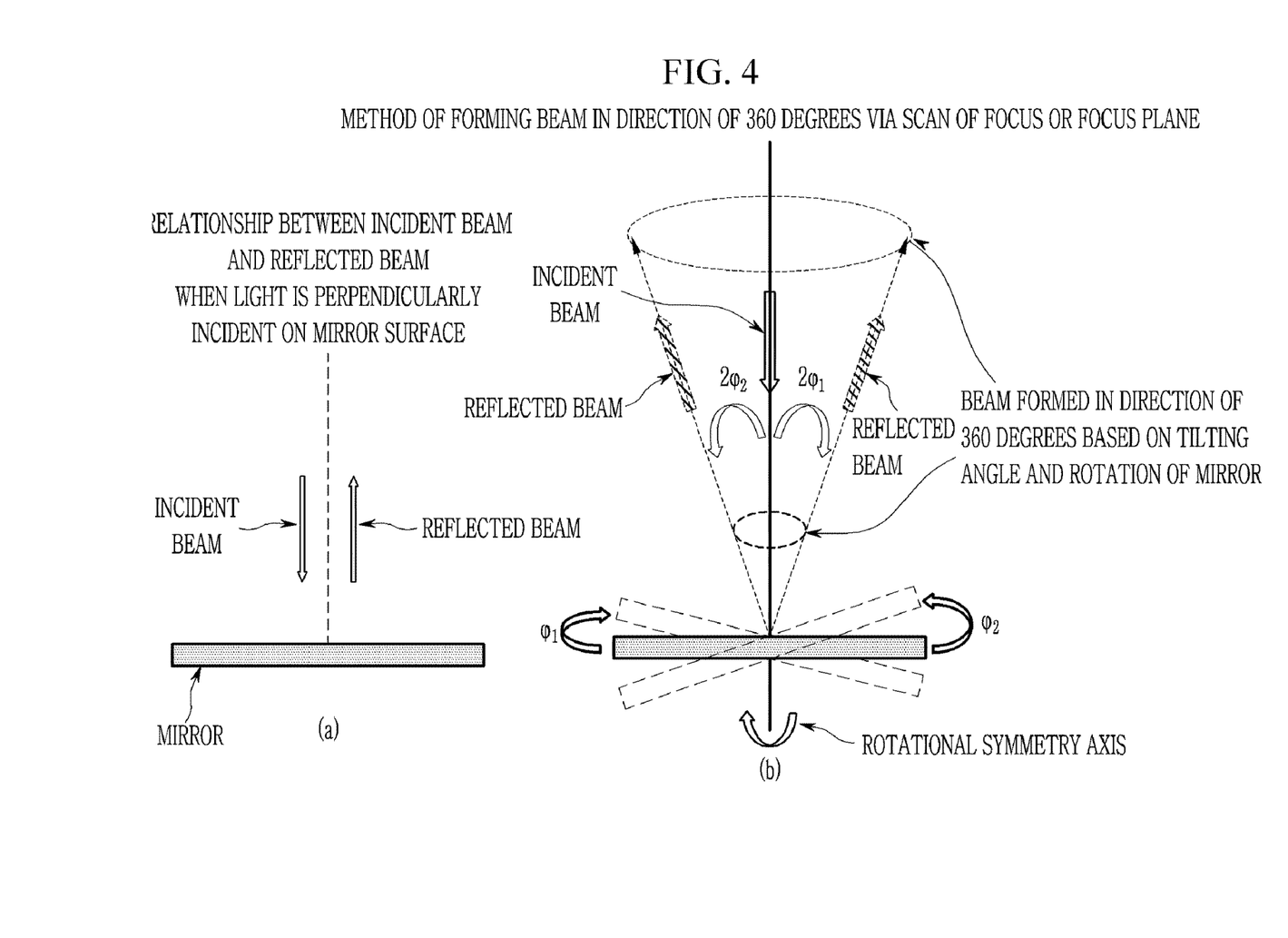
FIG. 4 is a diagram showing a method of forming a beam pattern in a direction of 360 degrees via focus scan (or focus plane scan) using a microelectromechanical system (MEMS) mirror according to an exemplary embodiment of the present invention.
Figure 5:
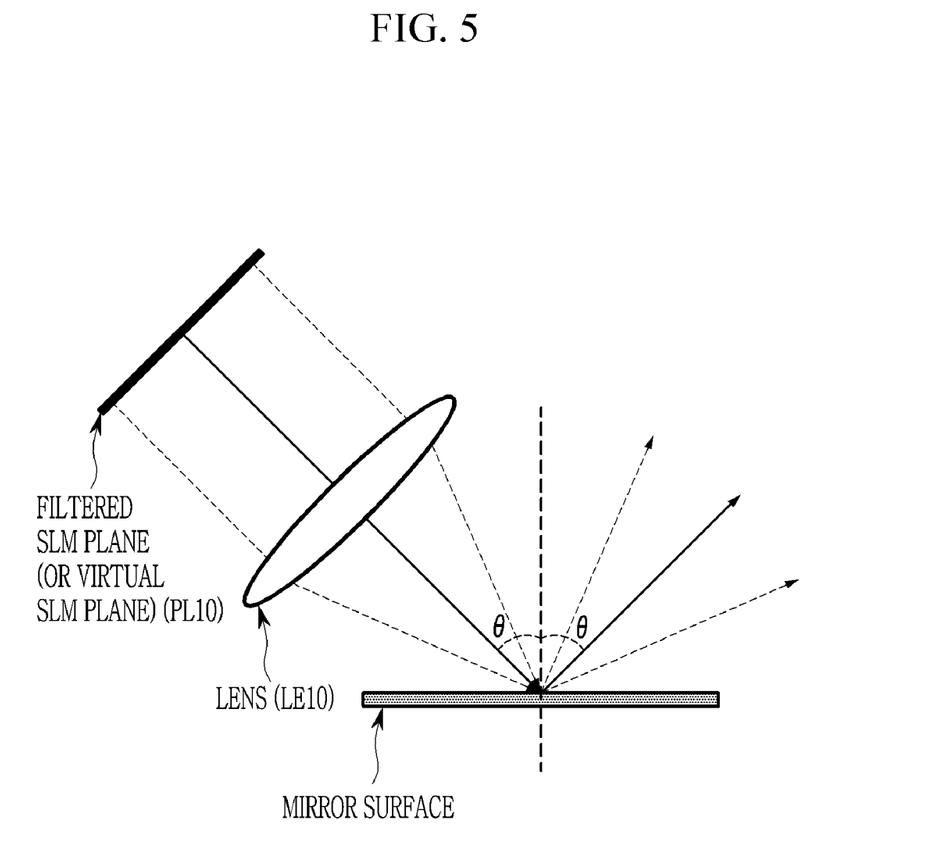
FIG. 5 is a diagram showing a case in which a focus and a focus plane focused on a mirror surface at an incident angle θ are reflected by a MEMS scanner mirror surface based on Snell's law according to an exemplary embodiment of the present invention.

FIG. 3 is a diagram showing a 360-degree holographic display apparatus using a hologram focus plane scanning scheme according to an exemplary embodiment of the present invention. FIG. 4 is a diagram showing a method of forming a beam pattern in a direction of 360 degrees via focus scan (or focus plane scan) using a microelectromechanical system (MEMS) mirror according to an exemplary embodiment of the present invention. FIG. 5 is a diagram showing a case in which a focus and focus plane focused on a mirror surface at an incident angle θ are reflected by a MEMS scanner mirror surface based on Snell's law according to an exemplary embodiment of the present invention.

A holographic display apparatus 100 may include a coherent light source 110, an SLM illumination optical system 120, an SLM 130, a filtering optical system 140, a focus/focus plane formation optical system 150, a focus/focus plane scanner 160, a 360-degree formation optical system 170, and a projection optical system 180.

The coherent light source 110 may be an incident light source and, in general, may be a coherent light source such as a laser.

The SLM illumination optical system 120 may be a device for enlarging the coherent light source 110 to uniformly illuminate the SLM 130 with uniform intensity and phase.

The SLM 130 is a device for displaying a computer generated hologram (CGH). In detail, the SLM 130 may be a device with a sectional structure illustrated in FIG. 1. To implement the SLM 130, a digital micro-mirror device (DMD), a liquid crystal (LC), a liquid crystal on silicon (LCoS), or the like may be mainly used. The SLM 130 may have a function of modulating an amplitude or phase of an incident light source.

Light transmitted through the SLM 130 may be diffracted in a specific form by a CGH pattern and, in this case, light diffracted in a specific form may form a 3D hologram image. In detail, the SLM 130 may diffract incident light in a form corresponding to the CGH pattern to generate an image signal. The diffracted image signal may be represented as direct current (DC), a high order of diffraction beam, or the like. To realize a hologram image, ±primary component is mainly used as an image signal.

The filtering optical system 140 may filter the image signal diffracted by the SLM 130. In detail, with respect to the diffracted image signal, the filtering optical system 140 may filter a DC region and select a primary diffraction light region. For example, the filtering optical system 140 may remove a $0^{th}$ component (e.g., DC component) from signal components included in the diffracted image signal to select ±primary component (e.g., diffraction light).

A filtered SLM plane PL10 is not a physical plane on which an SLM is actually present. The filtered SLM plane PL10 may be an image plane based on the signal component selected by the filtering optical system 140. In detail, the filtered SLM plane PL10 may be a plane formed by filtering an image signal represented by the SLM 130 by the filtering optical system 140 and may be a virtual SML plane formed by representing a diffracted image signal by the filtering optical system 140. That is, the virtual SLM plane may be an image plane configured with only a filtered image signal.

With respect to the filtered SLM plane PL10, the focus/focus plane formation optical system 150 may form a focus (or a focus plane) using a lens or the like. The focus plane may refer to a plane on which a focus is present and a size of the focus plane may be smaller than the filtered SLM plane PL10. In detail, the focus/focus plane formation optical system 150 may form a flat surface of a focus (focus plane) with a smaller size than the filtered SLM plane PL10 on a surface of a mirror installed on the focus/focus plane scanner 160 via focusing on the filtered SLM plane PL10.

The focus/focus plane scanner 160 may scan the focus (or focus plane) through a mirror (e.g., a MEMS mirror with a diameter of 1 um to 20 mm) that is electronically driven and uses a MEMS method. In the specification, the focus/focus plane scanner 160 may be referred to as a MEMS scanner 160. In detail, the focus/focus plane scanner 160 may control a tilting angle of the MEMS mirror and rotation of the MEMS mirror and form a beam of a direction of 360 degrees according to the tilting angle of the MEMS mirror and rotation of the MEMS mirror. That is, the focus/focus plane scanner 160 may form a direction of an optical axis of an image of a focus (or focus plane) in a circular form according to a tilting angle of an optical axis of the MEMS mirror and rotation with respect to a central axis of the MEMS mirror. With reference to FIG. 4, a method of rotating the focus (or focus plane) will be described in terms of comparison with reflection at a general mirror.

A relationship between a diameter of the MEMS mirror and the focus/focus plane formation optical system 150 may be obtained according to Equation 2 below.

$$D \geq 2 \times f \times \tan[\sin^{-1}(\lambda/2s)] \quad \text{[Equation 2]}$$

In Equation 2, D is a diameter of a MEMS mirror, f is a focal distance of a lens (e.g., a lens of the focus/focus plane formation optical system 150) for forming a focus (or focus plane), λ is a wavelength of the incident light source 110, and s is a pixel pitch on the virtual plane PL10 formed in front of a lens (e.g., the lens of the focus/focus plane formation optical system 150) for forming a focus (or focus plane).

An image signal of the filtered SLM plane PL10 transmitted through the focus/focus plane formation optical system 150 may be focused in the form of a focus (or focus plane) on a surface of the MEMS mirror installed on the focus/focus plane scanner 160. That is, the focus/focus plane formation optical system 150 may focus a signal of the filtered SLM plane PL10 in the form of a focus plane on the surface of the MEMS mirror through a lens or the like.

With respect to light (or signal) focused in the form of a focus (or focus plane), the focus/focus plane scanner 160 may tilt a beam path at a tilting angle φ of a mirror surface and, simultaneously, rotate the mirror in a direction of a rotational symmetry axis (or a mirror center axis), as illustrated in FIG. 4B. That is, the focus/focus plane scanner 160 may tilt a path of a reflected beam according to an angle φ1 indicating a degree by which a MEMS mirror is tilted with respect to an axis (e.g., optical axis) of the MEMS mirror in a first direction (e.g., an upward direction based on an optical axis of the MEMS mirror) and an angle φ2 indicating a degree by which a MEMS mirror is tilted with respect to an axis (e.g., optical axis) of the MEMS mirror in a second direction (e.g., a downward direction based on the optical axis of the MEMS mirror) opposite to the first direction and rotate the MEMS mirror based on the central axis (or the rotational symmetry axis) of the MEMS mirror. The MEMS mirror may alternately have a tilting angle φ1 and a tilting angle φ2.

As such, the focus/focus plane scanner 160 may switch a direction of a reflected beam to form a reflected beam in a circular direction of 360 degrees. As illustrated in FIG. 4A, when light is perpendicularly incident on a mirror surface, an incident beam and a reflected beam are parallel to each other. However, when a method of forming a beam in a direction of 360 degrees via focus (or focus plane) scan illustrated in FIG. 4B is used, a reflected beam of an incident beam may be formed in a direction of 360 degrees according to tilting angles (e.g., φ1 and φ2) and rotation of the MEMS mirror.

When a beam (a beam distributed in a direction of 360 degrees) formed by the focus/focus plane scanner 160 is input to the 360-degree formation optical system 170, the 360-degree formation optical system 170 may form a stereoscopic hologram image in a direction of 360 degrees. Here, the 360-degree formation optical system 170 may be configured with an omnidirectional lens or a conical lens. In detail, the 360-degree formation optical system 170 may apply a beam (a beam in a direction of 360 degrees) formed by the focus/focus plane scanner 160 to the omnidirectional lens or the conical lens to form a hologram image in a direction of 360 degrees.

The projection optical system 180 may project a stereoscopic hologram image formed in a direction of 360 degrees. As such, the stereoscopic hologram image may be lastly provided to a user.

The holographic display apparatus 100 may further include various components in addition to the components 110 to 180 illustrated in FIG. 3.

When a focus (or focus plane) of an image signal focused from the filtered SLM plane (or a virtual SLM plane) PL10 is incident on a surface of a MEMS mirror at an angle θ, a beam path may be changed according to the Snell's law, as illustrated in FIG. 5. A lens LE10 illustrated in FIG. 5 may be used to form a focus (or focus plane) and may be included in the focus/focus plane formation optical system 150.

Figure 6:
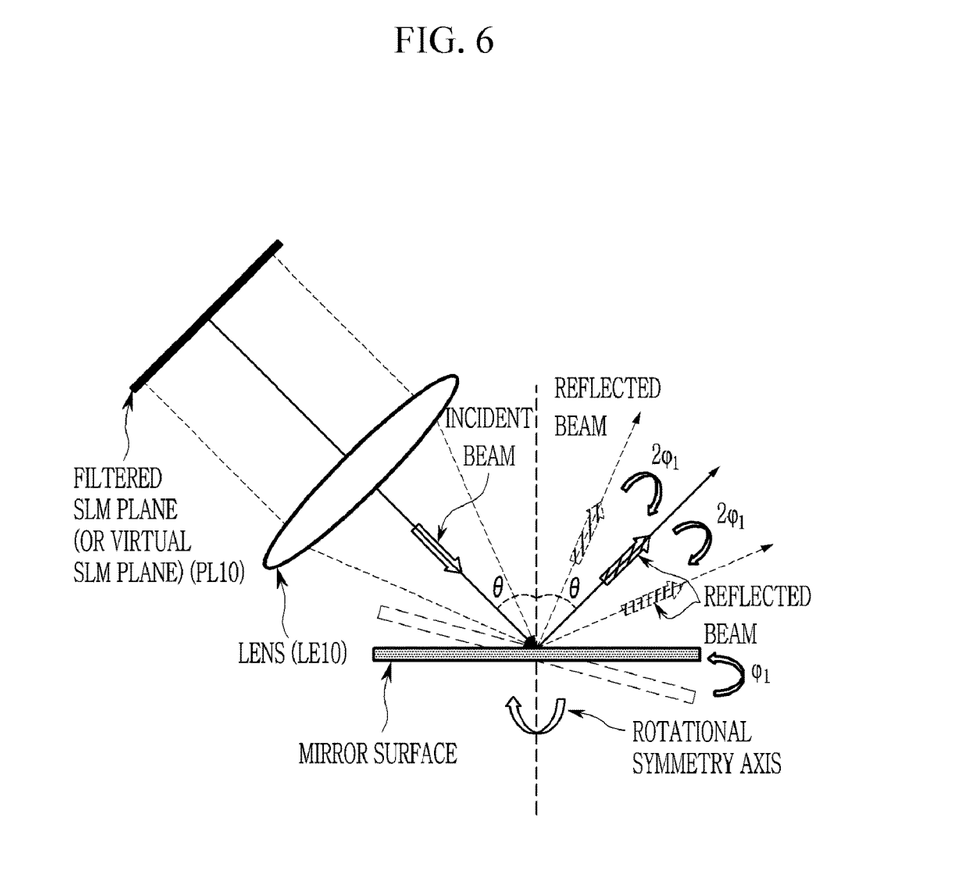
FIG. 6 is a diagram illustrating a method of forming a beam pattern in a direction of 360 degrees through focus scan (or focus plane scan) using a MEMS mirror formed by applying FIG. 4 and FIG. 5 according to an exemplary embodiment of the present invention.

FIG. 6 is a diagram illustrating a method of forming a beam pattern in a direction of 360 degrees through focus scan (or focus plane scan) using a MEMS mirror formed by applying FIG. 4 and FIG. 5 according to an exemplary embodiment of the present invention.

In detail, FIG. 6 illustrates an example of a combination of the embodiment illustrated in FIG. 4 and the embodiment illustrated in FIG. 5.

It may be assumed that a focus (or focus plane) of an image signal focused through the lens LE10 from the filtered SLM plane (or a virtual SLM plane) PL10 is incident on a surface of a MEMS mirror at an angle θ. With respect to an incident beam with an angle θ, the focus/focus plane scanner 160 may tilt a beam path by a tilting angle φ1 of the surface of the MEMS mirror and, simultaneously, rotate the mirror in a direction of a rotational symmetry axis. As such, the focus/focus plane scanner 160 may change a direction of a reflected beam to form a reflected beam in a circular direction of 360 degrees. That is, when an incident beam has an angle θ, the reflected beam may be formed in a direction of 360 degrees by a tilting angle (e.g., φ1) of the MEMS mirror and rotation of the MEMS mirror.

For example, the focus/focus plane formation optical system 150 may allow a focus (or focus plane) to be incident on a surface of the MEMS mirror at a predetermined angle θ with respect to a central axis (or rotational symmetry axis) of the MEMS mirror through focus on the filtered SLM plane PL10. The focus/focus plane formation optical system 150 may focus a signal of the filtered SLM plane PL10 in the form of focus plane on a surface of the MEMS mirror through the lens LE10 or the like.

In addition, the focus/focus plane scanner 160 may form a beam in a direction of 360 degrees according to an angle φ1 indicating an tilting degree of the MEMS mirror with respect to an axis (e.g., optical axis) of the MEMS mirror and mirror rotation performed based on a central axis (or rotational symmetry axis) of the MEMS mirror.

Figure 7:
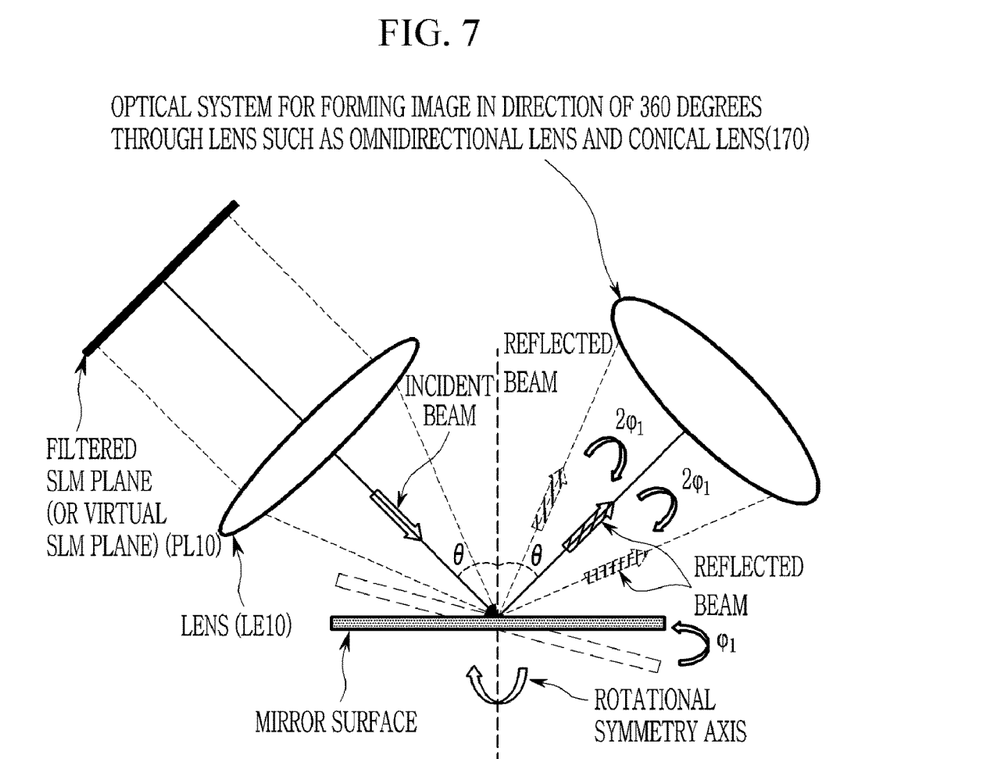
FIG. 7 is a diagram showing a method of forming a beam formed from a mirror installed in a MEMS scanner as a volumetric image according to an exemplary embodiment of the present invention.

FIG. 7 is a diagram showing a method of forming a beam formed from a mirror installed in a MEMS scanner as a volumetric image according to an exemplary embodiment of the present invention.

In detail, FIG. 7 illustrates an example of a case in which the 360-degree formation optical system 170 is applied to the exemplary embodiment illustrated in FIG. 6. Here, the 360-degree formation optical system 170 may form a stereoscopic hologram image in a direction of 360 degrees through an omnidirectional lens, a conical lens, or the like. In detail, the 360-degree formation optical system 170 may apply a beam (a beam in a direction of 360 degrees) formed by the focus/focus plane scanner 160 to an omnidirectional lens or a conical lens to form a hologram image in a direction of 360 degrees.

Figure 8:
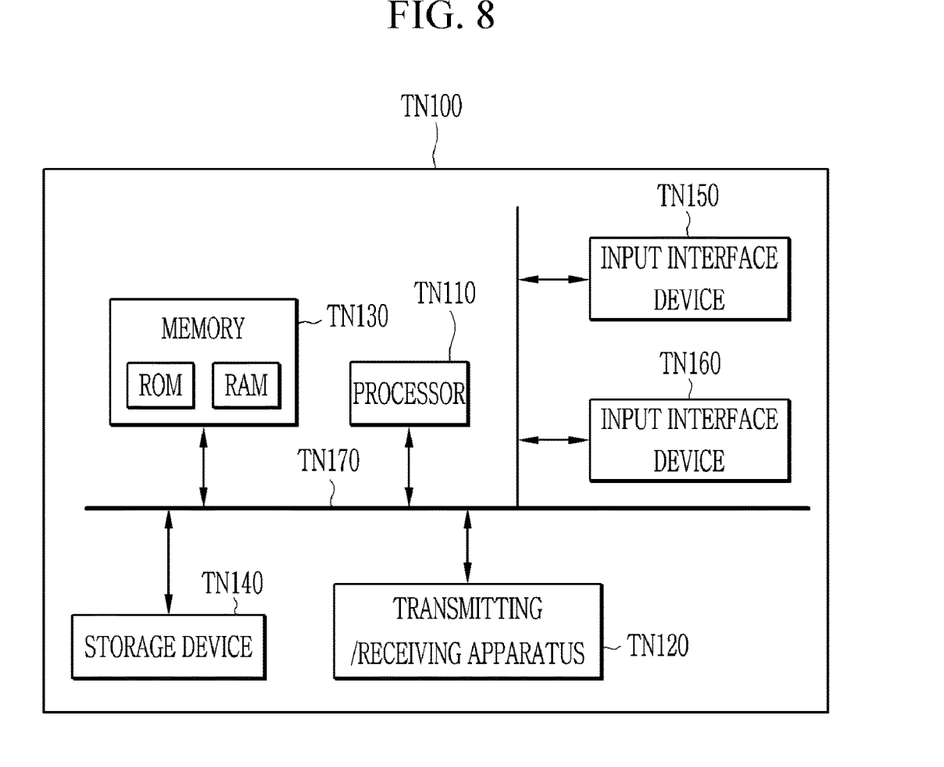
FIG. 8 is a diagram showing a computing apparatus according to exemplary embodiment of the present invention.

FIG. 8 is a diagram showing a computing apparatus according to exemplary embodiment of the present invention. A computing apparatus TN100 of FIG. 8 may be the holographic display device 100 described in the specification, a holographic display system, or the like.

In the exemplary embodiment of FIG. 8, the computing apparatus TN100 may include at least one processor TN110 and a memory TN130. The computing apparatus TN100 may further include a transmitting/receiving device TN120 that is connected to a network to perform communication, a storage device TN140, an input interface device TN150, an output interface device TN160, and so on. The constituent elements included in the computing apparatus TN100 may be connected to each other via a bus TN170 to communicate with each other.

The processor TN110 may execute a program command stored in at least one of the memory TN130 and the storage device TN140. The processor TN110 may refer to a central processing unit (CPU), a graphic processing unit (GPU), or a dedicated processor for performing methods according to an exemplary embodiment of the present invention. The processor TN110 may be configured to embody procedures, functions, and methods described with regard to an exemplary embodiment of the present invention. The processor TN110 may control each constituent element of the computing apparatus TN100.

Each of the memory TN130 and the storage device TN140 may store various information items related to an operation of the processor TN110. Each of the memory TN130 and the storage device TN140 may be configured as at least one of a volatile storage medium and a non-volatile storage medium. For example, the memory TN130 may be configured as at least one of a read only memory (ROM) and a random access memory (RAM).

The transmitting/receiving device TN120 may transmit or receive a wired signal or a wireless signal.

An exemplary embodiment of the present invention is not implemented through only the apparatus and/or method that has been described thus far and may be embodied through a program for implementing functions corresponding to components according to an exemplary embodiment of the present invention or a recording medium with the program recorded thereon, which may be easily implemented by a person of an ordinary skill in the art from the aforementioned exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A holographic display apparatus comprising:
a spatial light modulator configured to diffract light emitted from an incident light source with a shape corresponding to a computer generated hologram (CGH) pattern to generate an image signal;
a filtering optical system configured to filter the image signal to select a first signal component among signal components included in the image signal;
a first formation optical system configured to form a focus plane with a smaller size than the first image plane on a surface of a mirror via focus on the first image plane based on the first signal component; and
a focus scanner including the mirror that reflects an incident beam of the focus plane, the focus scanner configured to form a reflected beam in a direction of 360 degrees by tilting a path of the reflected beam based on a first angle and a second angle of the mirror and by rotating the mirror with respect to a central axis of the mirror, the first angle indicating a degree by which the mirror is tilted in a first direction with respect to an optical axis of the mirror, the second angle indicating a degree by which the mirror is tilted in a second direction opposite to the first direction with respect to the optical axis of the mirror.

2. The holographic display apparatus of claim 1, wherein:
the first formation optical system focuses a signal of the first image plane in the form of the focus plane on the surface of the mirror through a lens.

3. The holographic display apparatus of claim 1, wherein:
the mirror has a diameter equal to or less than 20 mm and a microelectromechanical system (MEMS) method is applied to the mirror.

4. The holographic display apparatus of claim 1, further comprising a second formation optical system configured to apply the reflected beam to an omnidirectional lens to form a hologram image in a direction of 360 degrees.

5. The holographic display apparatus of claim 1, further comprising a second formation optical system configured to apply the reflected beam to a conical lens to form a hologram image in a direction of 360 degrees.

6. The holographic display apparatus of claim 2, wherein a diameter of the mirror satisfies the following equation:

$$D \geq 2 \times f \times \tan[\sin^{-1}(\lambda/2s)] \quad \text{[Equation]}$$

where D is the diameter of the mirror, f is a focal distance of the lens, $\lambda$ is a wavelength of the incident light source, and s is a pixel pitch on the first image plane formed in front of the lens.

7. A holographic display apparatus comprising:
a filtering optical system configured to filter an image signal diffracted by a spatial light modulator;
a first formation optical system configured to allow a focus plane to be incident on a surface of a mirror at a first angle with respect to a central axis of the mirror via focus on a first image plane based on the filtered image signal; and
a focus scanner including the mirror that reflects an incident beam of the focus plane, the focus scanner configured to form a reflected beam in a direction of 360 degrees by tilting a path of the reflected beam based on a first angle and a second angle of the mirror and by rotating the mirror with respect to a central axis of the mirror, the first angle indicating a degree by which the mirror is tilted in a first direction with respect to an optical axis of the mirror, the second angle indicating a degree by which the mirror is tilted in a second direction opposite to the first direction with respect to the optical axis of the mirror.

8. The holographic display apparatus of claim 7, wherein:
the first formation optical system focuses a signal of the first image plane in the form of the focus plane with a smaller size than the first image plane on the surface of the mirror through a lens.

9. The holographic display apparatus of claim 7, wherein:
the mirror has a diameter equal to or less than 20 mm and a microelectromechanical system (MEMS) method is applied to the mirror.

10. The holographic display apparatus of claim 7, further comprising a second formation optical system configured to apply the reflected beam to an omnidirectional lens to form a hologram image in a direction of 360 degrees.

11. The holographic display apparatus of claim 7, further comprising a second formation optical system configured to apply the reflected beam to a conical lens to form a hologram image in a direction of 360 degrees.

12. The holographic display apparatus of claim 8, wherein a diameter of the mirror satisfies the following equation:

$$D \geq 2 \times f \times \tan[\sin^{-1}(\lambda/2s)], \quad \text{[Equation]}$$

where D is the diameter of the mirror, f is a focal distance of the lens, $\lambda$ is a wavelength of the incident light source, and s is a pixel pitch on the first image plane formed in front of the lens.

13. A method of displaying a holographic display apparatus, the method comprising:
diffracting light emitted from an incident light source with a shape corresponding to a computer generated hologram (CGH) pattern to generate an image signal;
filtering the image signal;
forming a focus plane on a surface of a mirror via focus on a first image plane based on the filtered image signal; and
forming a reflected beam in a direction of 360 degrees by tilting a path of the reflected beam based on a first angle and a second angle of the mirror and by rotating the mirror with respect to a central axis of the mirror, the first angle indicating a degree by which the mirror is tilted in a first direction with respect to an optical axis of the mirror, the second angle indicating a degree by which the mirror is tilted in a second direction opposite to the first direction with respect to the optical axis of the mirror, and the mirror reflecting an incident beam of the focus plane.

14. The method of claim 13, wherein the forming of the focus plane further includes:
focusing a signal of the first image plane in the form of the focus plane with a smaller size than the first image plane on the surface of the mirror through a lens.

15. The method of claim 13, wherein the forming of the focus plane further includes:
allowing the focus plane to be incident on the surface of the mirror at a third angle with respect to the central axis of the mirror through a lens.

16. The method of claim 13, further comprising
applying the reflected beam to an omnidirectional lens or a conical lens to form a hologram image in a direction of 360 degrees.

17. The method of claim 13, wherein:
the mirror has a diameter equal to or less than 20 mm and a microelectromechanical system (MEMS) method is applied to the mirror.

18. The method of claim 14, wherein a diameter of the mirror satisfies the following equation:

$$D \geq 2 \times f \times \tan[\sin^{-1}(\lambda/2s)] \qquad \text{[Equation]}$$

where D is the diameter of the mirror, f is a focal distance of the lens, $\lambda$ is a wavelength of the incident light source, and s is a pixel pitch on the first image plane formed in front of the lens.

* * * * *